(12) United States Patent
Wu (10) Patent No.: US 7,720,862 B2
(45) Date of Patent: May 18, 2010

(54) REQUEST-BASED KNOWLEDGE ACQUISITION

(75) Inventor: Yuh-Cherng Wu, San Jose, CA (US)

(73) Assignee: SAP AG, Walldorf (DE)

( * ) Notice: Subject to any disclaimer, the term of this patent is extended or adjusted under 35 U.S.C. 154(b) by 903 days.

(21) Appl. No.: 10/873,604

(22) Filed: Jun. 22, 2004

(65) Prior Publication Data

US 2005/0283495 A1 Dec. 22, 2005

(51) Int. Cl.
*G06F 7/00* (2006.01)
(52) U.S. Cl. .................... 707/780; 707/999.006
(58) Field of Classification Search ............ 707/1–10, 707/100–102, 104.1, 200, 780, 999.006; 706/45, 46, 50, 52; 715/501.1, 526, 234; 709/201–203, 217–231; 705/1
See application file for complete search history.

(56) References Cited

U.S. PATENT DOCUMENTS

| | | | | |
|---|---|---|---|---|
| 5,220,622 | A * | 6/1993 | Scarr | 382/210 |
| 5,864,845 | A * | 1/1999 | Voorhees et al. | 707/5 |
| 5,870,731 | A * | 2/1999 | Trif et al. | 706/52 |
| 5,953,718 | A * | 9/1999 | Wical | 707/5 |
| 6,003,082 | A * | 12/1999 | Gampper et al. | 709/225 |
| 6,014,700 | A * | 1/2000 | Bainbridge et al. | 709/226 |
| 6,029,165 | A * | 2/2000 | Gable | 707/3 |
| 6,055,516 | A * | 4/2000 | Johnson et al. | 705/27 |
| 6,070,185 | A * | 5/2000 | Anupam et al. | 709/204 |
| 6,078,914 | A * | 6/2000 | Redfern | 707/3 |
| 6,505,183 | B1 * | 1/2003 | Loofbourrow et al. | 706/45 |
| 6,510,434 | B1 * | 1/2003 | Anderson et al. | 707/100 |
| 6,535,878 | B1 * | 3/2003 | Guedalia et al. | 707/8 |
| 6,665,657 | B1 * | 12/2003 | Dibachi | 707/3 |
| 6,745,177 | B2 * | 6/2004 | Kepler et al. | 707/3 |
| 6,826,553 | B1 * | 11/2004 | DaCosta et al. | 707/1 |
| 6,856,996 | B2 * | 2/2005 | Chow et al. | 707/102 |
| 7,051,014 | B2 * | 5/2006 | Brill et al. | 707/2 |
| 7,130,877 | B2 * | 10/2006 | McNeely et al. | 709/201 |
| 7,155,503 | B2 * | 12/2006 | Ishihara et al. | 709/223 |
| 7,219,107 | B2 * | 5/2007 | Beringer | 707/104.1 |
| 2002/0065671 | A1 * | 5/2002 | Goerz et al. | 705/1 |
| 2003/0061204 | A1 * | 3/2003 | Parry | 707/3 |
| 2003/0065663 | A1 * | 4/2003 | Chu | 707/10 |

(Continued)

OTHER PUBLICATIONS

U.S. Appl. No. 10/781,143, filed Feb. 18, 2004, Yuh-Cherng Wu.

(Continued)

*Primary Examiner*—Miranda Le
(74) *Attorney, Agent, or Firm*—Mintz, Levin, Cohn, Ferris, Glovsky & Popeo, P.C.

(57) ABSTRACT

One implementation provides a method for acquiring knowledge from multiple knowledge bases in a knowledge repository. The method includes identifying first and second knowledge bases within the knowledge repository by analyzing a search request received from a client system. The first knowledge base contains knowledge of a first type and the second knowledge base contains knowledge of a second type. The method further includes generating instructions that, when executed, cause first and second requests to be sent to the knowledge repository in sequential fashion to acquire knowledge from the first and second knowledge bases, such that the second request is sent after the first request, and such that the second request includes knowledge of the first type from the first knowledge base acquired in response to the first request.

12 Claims, 4 Drawing Sheets

U.S. PATENT DOCUMENTS

| | | | |
|---|---|---|---|
| 2003/0172061 A1* | 9/2003 | Krupin et al. | 707/3 |
| 2003/0195877 A1* | 10/2003 | Ford et al. | 707/3 |
| 2004/0019588 A1* | 1/2004 | Doganata et al. | 707/3 |
| 2004/0138988 A1* | 7/2004 | Munro et al. | 705/37 |
| 2004/0260692 A1* | 12/2004 | Brill et al. | 707/5 |
| 2005/0004807 A1* | 1/2005 | Fenstermaker et al. | 705/1 |
| 2005/0055342 A1* | 3/2005 | Bharat et al. | 707/3 |
| 2006/0200455 A1* | 9/2006 | Wilson | 707/4 |
| 2007/0208697 A1* | 9/2007 | Subramaniam et al. | 707/3 |

OTHER PUBLICATIONS

"TREX ABAP API for Attribute Engine, Document Version 2.0," *SAP AG*, Jul. 25, 2003, TREXT_INDEXLIST; TREXS_INDEXLIST, p. 9, entire document pp. 1-17 provided.

* cited by examiner

REQUEST-BASED KNOWLEDGE ACQUISITION

TECHNICAL FIELD

This application relates to request-based knowledge acquisition in computing systems.

BACKGROUND

In today's technology age, information and information sources are plentiful. On the World Wide Web, for example, individuals are capable of obtaining information from all over the world. Database and web servers may provide users with information about fixing a car, buying products or services, and the like. By using search engines, an individual can quickly and easily search for information by entering a series of search terms.

Search engines often provide compilation and retrieval services. One example of a compilation service involves the use of "spiders" that crawl through the World Wide Web and search for web sites and web-site content. The information from these web sites is then compiled into search indexes. A master index may be used to store references to the various web sites and also to store information contained in the web-site content. Certain terms may be associated with the entries stored in the master index. Then, when an individual user enters one or more search terms during a search operation, the search engine references its master index to locate web-site references or web-site content associated with terms that match those from the user's search request.

Because of the growing amount of data contained within the World Wide Web and other information sources, it often may be difficult for users to obtain all of the information they need by using only a single search request. For example, if a user wants to obtain information from within a company's Intranet, the user may need to execute multiple searches and access multiple knowledge bases, or information sources, to retrieve all of the needed information. Alternatively, a service field agent may need to execute multiple searches and collect information from various different sources when interacting with customers.

SUMMARY

Various implementations are provided herein. One implementation provides a method for acquiring knowledge from multiple knowledge bases in a knowledge repository. The method includes identifying first and second knowledge bases within the knowledge repository by analyzing a search request received from a client system. The first knowledge base contains knowledge of a first type and the second knowledge base contains knowledge of a second type. The method further includes generating instructions that, when executed, cause first and second requests to be sent to the knowledge repository in sequential fashion to acquire knowledge from the first and second knowledge bases, such that the second request is sent after the first request, and such that the second request includes knowledge of the first type from the first knowledge base acquired in response to the first request.

Various implementations may provide certain benefits and advantages. For example, a user of a mobile device can submit a request to acquire needed information via a free-text description or selections from a set of predefined fields with values. The request can be parsed and analyzed using an existing natural language processing tool to create a set of possible search/retrieval requests against possible knowledge bases. Based on the set of identified requests, a script generator can further determine a proper sequence and additional retrieval rules to improve content relevancy and retrieval performance. Once the script is generated, the script will be automatically executed to acquire knowledge from selected knowledge bases.

The details of one or more implementations are set forth in the accompanying drawings and the description below. Other features, objects, and advantages will be apparent from the description and drawings, and from the claims.

DETAILED DESCRIPTION

Figure 1:
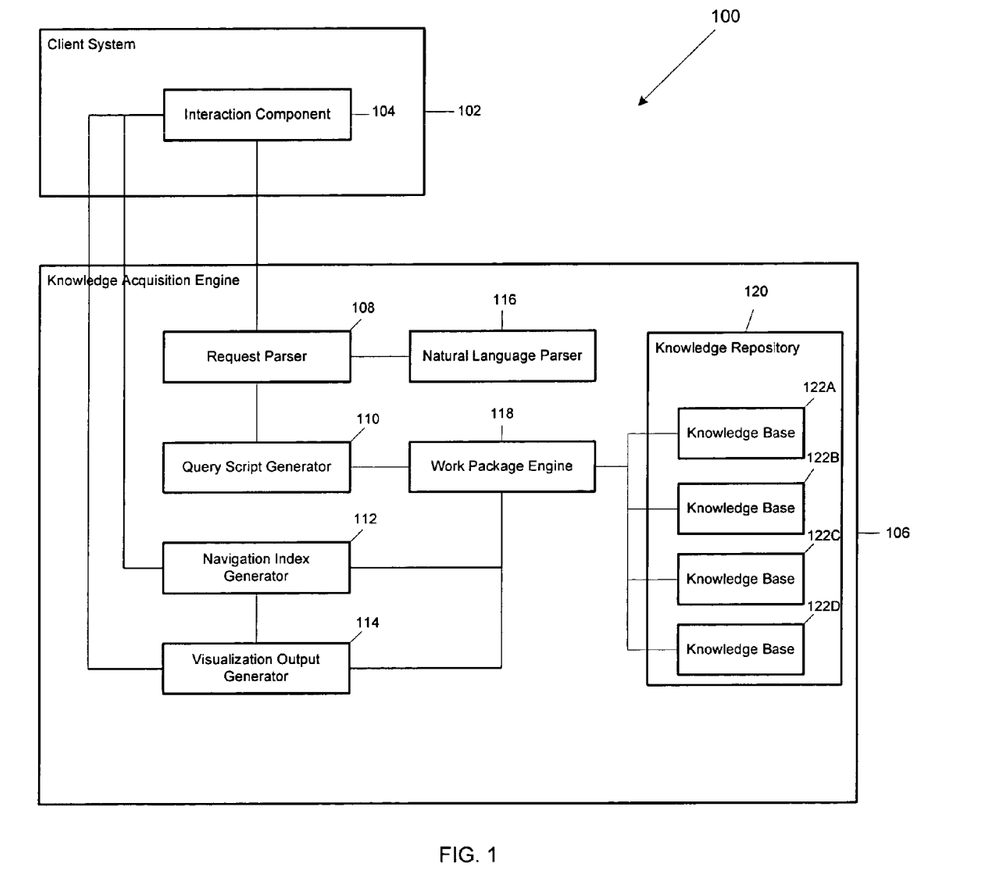
FIG. 1 is a block diagram of a system that may be used to acquire knowledge from a knowledge repository, according to one implementation.

FIG. 1 is a block diagram of a system 100 that may be used to acquire knowledge from a knowledge repository 120, according to one implementation. In this implementation, the system 100 includes a client system 102 that is coupled to a knowledge acquisition engine 106. The knowledge repository 120 is contained within the knowledge acquisition engine 106. During operation, the client system 102 sends a search request to the knowledge acquisition engine 106. The knowledge acquisition engine 106 analyzes the search request to identify two of the knowledge bases 122A and 122B, for example, within the knowledge repository 120. The knowledge repository 120 also contains knowledge bases 122C and 122D. The knowledge acquisition engine 106 then automatically generates a script having instructions that, when executed, cause the knowledge acquisition engine 106 to send two requests to the knowledge repository 120 in sequential fashion to acquire knowledge from the two identified knowledge bases 122A and 122B. The first request is sent to the knowledge base 122A. The second request is sent to the knowledge base 122B and includes knowledge from the knowledge base 122A acquired in response to the first request. The knowledge that is acquired from the knowledge bases 122A and 122B is then routed back to the client system 102. In this fashion, the client system 102 is able to provide a single request to the knowledge acquisition engine 106 and thereby obtain knowledge from various different knowledge bases within the knowledge repository 120. The knowledge acquisition engine 106 manages the detailed flow of communication with these knowledge bases.

The client system 102 includes an interaction component 104. The interaction component 104 manages the flow of information to and from the knowledge acquisition engine 106. In one implementation, the client system 102 is a mobile device, such as a personal digital assistant (PDA), that uses a wireless interface to communicate with the knowledge acquisition engine 106. The knowledge acquisition engine 106 also includes a request parser 108, a query script generator 110, a navigation index generator 112, a visualization output generator 114, a natural language parser 116, and a work package engine 118.

The request parser 108 is coupled to the interaction component 104 of the client system 102. The request parser 108 processes requests that are sent to the knowledge acquisition engine 106 from the client system 102. For example, the request parser 108 may analyze an incoming request and interpret various fields and/or formats of the request. The request parser 108 is coupled to the natural language parser 116 and may uses the natural language parser 116 when processing incoming requests sent from the client system 102. The natural language parser 116 is able to help process requests sent from the client system 102 having natural or free-text components. For example, a user of the client system 102 may enter various search terms or keywords in English using a free-text form. These terms or keywords are then provided in a request that is sent by the client system 102 to the knowledge acquisition engine 106. The natural language parser 116 and the request parser 108 are able to process this request. In another scenario, the request sent by the client system 102 may be a formatted request having a predefined structure. In this scenario, the request parser 108 may be able to directly process the incoming request without using the natural language parser 116.

The request parser 108 is also coupled to the query script generator 110. The query script generator 110 automatically generates the scripts that are used to query the knowledge bases 122A, 122B, 122C, and/or 122D to acquire knowledge, or information, that can be sent back to the client system 102. For example, in one scenario, the knowledge base 122A may contain customer information and the knowledge base 122B may contain product information. The generated script, when executed, is able to cause knowledge to be acquired for both customer and product information. In one implementation, the scripts generated by the query script generator 110 include computer-executable instructions for querying the knowledge bases 122A and 122B in a sequential fashion. These instructions analyze information acquired from a first knowledge base and use this information as input when processing the request that is sent to the second knowledge base.

The query script generator 110 is coupled to the work package engine 118, which is coupled to the knowledge bases 122A, 122B, 122C, and 122D in the knowledge repository 120. The work package engine 118 uses the script generated by the script generator 110 to send requests to and acquire knowledge from the knowledge bases 122A, 122B, 122C, and/or 122D. The work package engine 118 is further coupled to the navigation index generator 112 and the visualization output generator 114. The navigation index generator 112 generates a navigation index for the knowledge that has been acquired from the knowledge bases 122A, 122B, 122C, and/ or 122D. The client system 102 is able to use the navigation index that is generated by the navigation index generator 112 to navigate through and identify knowledge that has been provided by the knowledge acquisition engine 106. The visualization output generator 114 generates a visualization scheme that can be used by the client system 102 when navigating through the acquired knowledge. For example, the visualization output generator 114 may generate a specific form of graphical user interface (GUI) that is well suited for display purposes on the client system 102. The navigation index generator 112 and visualization output generator 114 are each coupled to the interaction component 104 in the client system 102.

The knowledge bases 122A, 122B, 122C, and 122D each contain knowledge of a particular type. For example, the knowledge base 122A, 122B, 122C, or 122D could contain task guidance knowledge to provide guidance when performing certain types of tasks, service history knowledge for service orders, solution knowledge to help solve problems, sales history knowledge, spare parts knowledge, service contract knowledge, pricing information knowledge, product information knowledge, or sales contract knowledge. In one implementation, each of the knowledge bases 122A, 122B, 122C, and 122D contain different types of knowledge.

In one implementation, the request parser 108 is capable of determining if individual knowledge bases can be accessed independently to satisfy a search request that is sent by the client system 102. For example, for any given request, the request parser 108 may determine that the knowledge bases 122A and 122B are to be accessed. If there is no identified correlation between the knowledge bases 122A and 122B, or if there is no knowledge dependency, the request parser 108 may determine that the knowledge bases 122A and 122B can be accessed in an independent fashion. In this case, the work package engine 118 sends a first request to the knowledge base 122A to acquire knowledge and sends a second, independent request to the knowledge base 122B to acquire knowledge. Because these requests are sent independently of each other, the work package engine 118 is capable of acquiring knowledge from the knowledge bases 122A and 122B in an efficient fashion.

In one implementation, knowledge acquisition engine 106 is able to identify knowledge bases that are to be accessed by analyzing search requests sent from the client system 102 and matching search information from these requests with contents of these knowledge bases. For example, the request parser 108 may determine that knowledge bases 122A and 122B are to be accessed for acquiring knowledge in response to receiving a search request from the client system 102. If the work package engine 118 does not obtain knowledge from the knowledge bases 122A and 122B that satisfies the search request, the query script generator 110 is capable of generating another script having instructions that, when executed by the work package engine 118, cause additional knowledge bases to be accessed. For example, based upon a previously identified relationship between the knowledge base 122A and 122C, the work package engine 118 may access each of the knowledge bases 122A, 122B, and 122C in a second iteration. The work package engine 118 then determines whether the knowledge acquired from the knowledge bases 122A, 122B, and 122C satisfies the search request received from the client system 102. If not, the work package engine 118 can continue to execute additional scripts that are generated by the query script generator 110 that identify additional knowledge bases, such as the knowledge base 122D, that have previously identified relationships with the knowledge bases 122A, 122B, and/or 122C and that may contain knowledge that is useful to the client system 102.

In one implementation, the knowledge repository 120 comprises a single data store and each of the knowledge bases 122A, 122B, 122C, and 122D comprise a separate portion of the single data store. In another implementation, the knowledge bases 122A, 122B, 122C, and 122D comprise four separate data stores for storing knowledge. In this implementation, the knowledge repository 120 comprises a logical collection of these four separate data stores.

Figure 2:
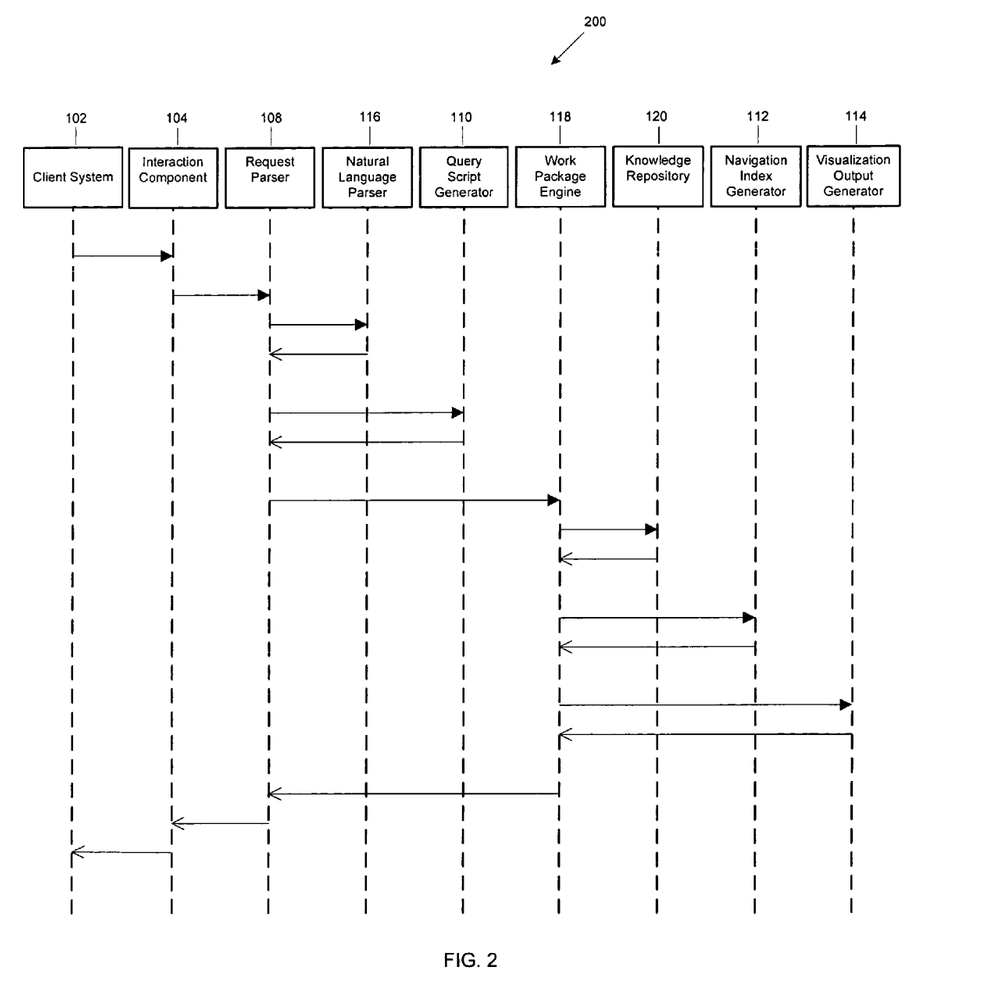
FIG. 2 is a use-case diagram showing interactions between various components in FIG. 1, according to one implementation.

FIG. 2 is a use-case diagram 200 showing interactions between various components in FIG. 1, according to one implementation. The actors that are shown in the example of FIG. 2 are the client system 102, the interaction component 104, the request parser 108, the natural language parser 116, the query script generator 110, the work package engine 118, the knowledge repository 120, the navigation index generator 112, and the visualization output generator 114.

As shown in the use-case diagram 200, the client system 102 first sends a search request to the interaction component 104. As described above, the search request may have many different forms. For example, the search request may include free-form text in search terms or keywords. Alternatively, the search request may include data having a predetermined form or structure. Various data elements may be contained in a data structure that is included within the request. In one implementation, a user of the client system 102 enters free-form text in a text-entry field, such as one or more search terms. The interaction component 104 processed the free-form text and creates a data structure to be included within a search request. The data structure includes a set of fields to store data in predefined formats. For example, a first field may be used to store product information and a second field may be used to store customer information. In this example, the interaction component 104 is capable of mapping the information contained within the free-form text into the first and second fields of the data structure that is contained within the request.

In another implementation, the user of the client system 102 selects values from menus within a graphical user interface (GUI). These menus contain predefined options for various items that may be relevant to the user's search. The client system 102 then creates a search request by including the selected values. These values may include customer, product, or other forms of information.

The interaction component 104 sends the request to the request parser 108 of the knowledge acquisition engine 106. The interaction component 104 manages the communication interface with the knowledge acquisition engine 106. In the implementation shown in FIG. 2, the request includes search terms or keywords in a specific language, such as English or a mixture of multiple languages. The request parser 108 uses the natural language parser 116 to process the request. The natural language parser 116 is capable of recognizing characters within the search terms or keywords and using a set of rules to determine the content (and in certain cases, the context) of the search terms or keywords. For example, the natural language parser 116 may be capable of identifying the language of each term and interpreting certain characters in the terms or keywords to determine that the request relates to specific product or customer information. The request parser 108 is able to use the output of the natural language parser 116 to determine which knowledge bases are to be accessed during the search. For example, if the search terms or keywords relate to both product and customer information, the request parser 108 is able to determine that the search operation is to access knowledge bases containing product and customer information. These knowledge bases contain knowledge of a different type. The request parser 108 is able to determine that more than one knowledge base is to be accessed based upon the search terms or keywords. In addition, the request parser 108 may be able to determine that two or more knowledge bases are to be accessed in a specific order. For example, the customer information may need to be accessed before the product information. The customer information may include location or identification data that is needed as input when accessing the specific product information that is needed. In this case, the request parser 108 determines that the knowledge base for customer information is to be accessed before the knowledge base for product information.

The request parser 108 provides information related to the processed search request to the query script generator 110. The query script generator 110 then generates an executable script containing computer-executable instructions. When executed, these instructions cause the knowledge acquisition engine 106 to access the identified knowledge bases in a predetermined order. As described above, the request parser 108 is able to identify the knowledge bases (such as the knowledge bases 122A and 122B) within the knowledge repository 120 that are to be accessed during a search operation. These knowledge bases are identified from the content and/or the context of the request received from the client system 102. In this fashion, the client system 102 need only provide a search request, which may include a series of search terms or keywords. The client system 102 need not identify the specific knowledge bases that are to be accessed during the search operation. The knowledge acquisition engine 106 has the intelligence to process the request sent by the client system 102 and identify these knowledge bases. The instructions contained within the script generated by the script generator 110 include references to these identified knowledge bases.

As shown in FIG. 2, the script generator 110 provides the generated script back to the request parser 108. The request parser 108 then provides the script to the work package engine 118. The work package engine 118 executes the instructions contained within the script and collects knowledge that is acquired from the various knowledge bases contained within the knowledge repository 120. For example, in one scenario, the work package engine 118 executes the instructions in the generated script to acquire knowledge from the knowledge bases 122A and 122B in sequential fashion. The work package engine 118 sends a first request to the knowledge bases 122A to obtain customer information. This first request includes information from the request sent by the client system 102 and processed by the request parser 108. The work package engine 118 sends a second request to the knowledge bases 122B to obtain product information. The second request may include information from the request sent by the client system 102 but also includes some of the knowledge acquired from the knowledge base 122A relating to customer information. For example, the second request may include specific customer information that is needed to obtain specified product information from the knowledge base 122B. The request parser 108 uses the original request sent by the client system 102 to determine that the knowledge base 122A is to be accessed before the knowledge base 122B. This determination is then provided to the script generator 110, which generates the script that is executed by the work package engine 118.

In one implementation, the work package engine 118 is capable of sending requests to multiple knowledge bases within the knowledge repository 120 in parallel. For example, the work package engine 118 is capable of sending one request to the knowledge base 122A and another request in parallel to the knowledge base 122C, and then later sending a request to the knowledge base 122B and one in parallel to the knowledge base 122D. The script generated by the script generator 110 includes instructions to access these knowledge bases in a parallel fashion. For example, if the knowledge base 122A includes customer information and the knowledge base 122C includes store information, the request parser 108 may be able to determine from the incoming request sent by the client system 102 that these knowledge bases may be accessed in parallel. In this case, the work package engine 118 provides only information from the request received by the client system 102 in the distinct requests that are sent in parallel to the knowledge base 122A and to the knowledge base 122C (or to the knowledge base 122B and to the knowledge base 122D) when acquiring knowledge. In one implementation, requests may be sent in parallel to the same knowledge base during a search operation. For example, the work package engine 118 may send two separate requests to the knowledge base 122A in parallel and then later send additional requests to one of the other knowledge bases 122B, 122C, and/or 122D.

Once the work package engine 118 acquires the knowledge from each of the knowledge bases, such as the knowledge bases 122A and 122B, it provides this knowledge to the navigation index generator 112. The navigation index generator 112 generates a navigation index for the knowledge that has been acquired from the knowledge bases. The navigation index allows a use to navigate through and identify knowledge that has been collected from the knowledge bases 122A, 122B, 122C, and/or 122D. The work package engine 118 also invokes the visualization output generator 114. The visualization output generator 114 generates a visualization scheme that can be used by the client system 102 when navigating through the acquired knowledge. For example, the visualization output generator 114 may generate a specific form of graphical user interface (GUI) that is well suited for display purposes on the client system 102.

The work package engine 118 provides the knowledge acquired from the knowledge repository 120, along with the generated navigation index and visualization output, to the request parser 108. The request parser 108 then sends all of this information back to the client system 102 via the interaction component 104. The client system 102 uses the generated visualization output and navigation index to display the acquired knowledge to a user within a GUI. The user is able to view the acquired knowledge in an understandable form, and is also able to use the navigation index to navigate through the information retrieved from the knowledge repository 120.

Figure 3:
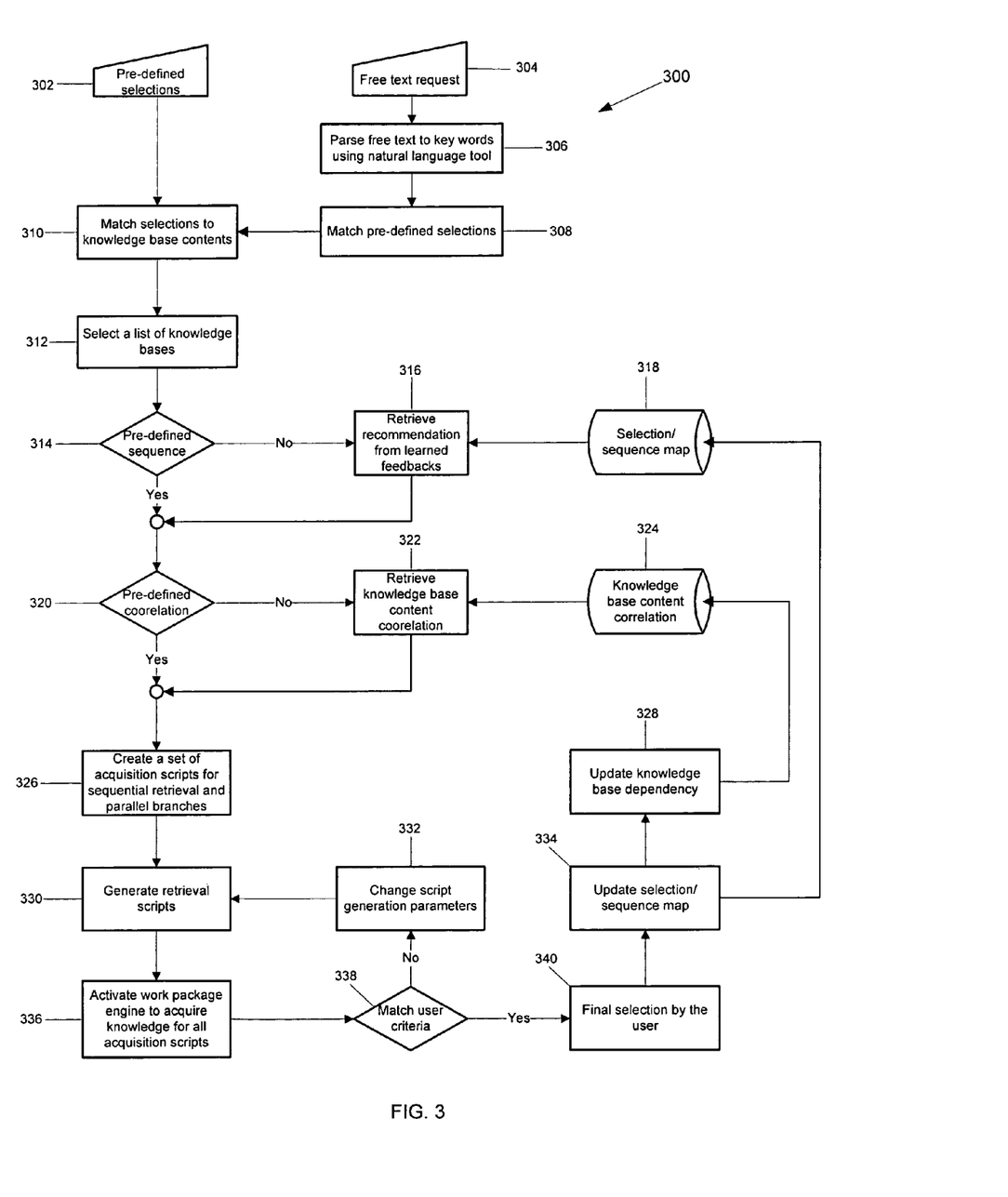
FIG. 3 is a flow diagram of a method to acquire knowledge from the knowledge repository shown in FIG. 1, according to one implementation.

FIG. 3 is a flow diagram of a method 300 to acquire knowledge from the knowledge repository 120 shown in FIG. 1, according to one implementation. In this implementation, the method 300 is performed by one or more of the components of the knowledge acquisition engine 106, such as the request parser 108, the natural language parser 116, the query script generator 110, and/or the work package engine 118.

If the request sent from the client system 102 includes a set of predefined selections 302, then the request parser 108 matches these selections to knowledge base contents within the knowledge base repository 120 in an action 310. These predefined selections 302 may include selections of values from search fields that are displayed in a graphical user interface (GUI) to a user on the client system 102. These selections can then be matched with contents of knowledge bases in the knowledge repository, such as the knowledge bases 122A or 122B. In one implementation, the request parser 108 accesses an index for the knowledge repository 120 to match these selections. This index has been compiled bases upon the content contained within the knowledge bases 122A, 122B, 122C, and/or 122D in the knowledge repository. In one implementation, there is one index associated with each knowledge base.

If the request sent from the client system 102 includes free text in a free text request 304, then the request parser 108 and the natural language parser 116 parse the free text into keywords in an action 306. The free text contains one or more textual characters. The parsers 108 and 116 are able to process the free text and identify one or more keywords from the textual characters. In one implementation, the request parser 108 uses the identified keywords to construct corresponding values for predefined fields. These keywords or corresponding values are then matched against predefined selections in an action 308. The request parser 108 manages the predefined selections within the knowledge acquisition engine 106 and determines which selections match the identified keywords or corresponding values. These matched selections are then checked against the knowledge base contents in the action 310.

In an action 312, a list of knowledge bases from the knowledge repository 120 is selected. These knowledge bases correspond to those containing the contents matched in the action 310. For example, if the matched contents correspond to specific customer and product information, the knowledge bases 122A and 122B may be selected in the action 312.

At a checkpoint 314, the query script generator 110 determines if there is a predefined sequence for accessing the selected knowledge bases. For example, the query script generator 110 may use a rule specifying that, based upon the request received from the client system 102, the knowledge base 122A is to be accessed before the knowledge base 122B. In one scenario, the rule may specify that the knowledge base 122A is to be accessed first regardless of the contents of the request received from the client system 102. If there is no predefined sequence, then the query script generator 316 retrieves a recommendation from learned feedbacks in 316. In one implementation, this recommendation comes from a learning engine that is contained within the knowledge acquisition engine 106. This recommendation for an access sequence is based upon feedback and knowledge received from prior iterations or previous requests sent to the knowledge repository 120 and selections made by the user. For example, if previous knowledge acquisition has occurred successfully when accessing the knowledge base 122A before the knowledge base 122B, the recommendation may specify that the knowledge base 122A should be accessed first. The knowledge acquisition engine 106 accesses the selection/sequence map 318 when retrieving a recommendation in the action 316. The map 318 includes sequences that are associated with specific selections of knowledge made by a user on the client system 102 during prior search operations.

If there is a predefined sequence determined at the checkpoint 314, this sequence is processed for later use within the knowledge acquisition engine 106. In one implementation, the predefined sequence providing a sequential access order is contained within a data store that is accessible by the knowledge acquisition engine 106 when generating scripts. In another implementation, the predefined sequence may be specified in the request provided by either the user or a business application. For example, if the knowledge base 122A contains customer information and the knowledge base 122B contains product information, the predefined sequence may indicate that the search request that is sent to the knowledge base 122B depends upon first receiving certain search results from the knowledge base 122A. At a checkpoint 320, the knowledge acquisition engine 106 determines if there is a predefined correlation between the knowledge bases that are to be accessed during a search operation. For example, if the knowledge bases 122A and 122B are to be accessed during a search operation, a predefined correlation may specify that whenever the knowledge base 122A is to be accessed, the knowledge base 122B must also be accessed based upon dependency considerations. For example, the knowledge base 122C may contain solutions for help desks and the knowledge base 122D may contain various documents that may be attached to solutions. There is a content correlation between the knowledge bases 122C and 122D, so when one of these knowledge bases 122C or 122D is in the list of knowledge base selection, the other knowledge base is also included for script generation, even if it is not specifically selected (according to one implementation).

If there is no predefined correlation that is identified at the checkpoint 320, the knowledge acquisition engine 106 retrieves knowledge base content correlation in an action 322. In one implementation, the correlation is based upon learned feedbacks from prior search operations and is processed by a learning engine. The knowledge acquisition engine 106 retrieves the knowledge base content correlation from a data store 324, which stores dependency information for the knowledge bases 122A, 122B, 122C, and 122D.

In an action 326, the query script generator 110 creates a set of acquisition scripts for sequential retrieval of knowledge from the knowledge bases 122A, 122B, 122C, and/or 122D in the knowledge repository 120. In the action 326, the query script generator 110 generates instructions that are stored within the acquisition scripts to access the knowledge bases 122A, 122B, 122C, and/or 122D in a sequential order according to the sequence and correlation rules determined in prior actions. These scripts are also stored by the query script generator 110, according to one implementation. In one implementation, the query script generator 110 also generates instructions for these scripts that provide parallel access of the knowledge bases 122A, 122B, 122C, and/or 122D. For example, the sequence and correlation rules may allow the knowledge bases 122A and 122C or 122B and 122B to be accessed in parallel. In this instance, script instructions generated by the query script generator 110 may specify that these knowledge bases be accessed in parallel.

In an action 330, the query script generator 110 completes generation of the scripts for execution by the work package engine 118. In the action 330, the query script generator 110 generates these scripts according to a format that is recognizable and usable by the work package engine 118. In certain instances, the work package engine 118 may be replaced by a different version or type of an engine that provides a different interface. The query script generator 110 is capable of generating scripts that conform to the format and interface specified by the engine that is used within the knowledge acquisition engine 106, such as the work package engine 118.

In an action 336, the knowledge acquisition engine 106 activates the work package engine 118 to acquire knowledge for all of the acquisition scripts. In the action 336, the work package engine 118 executes the instructions in these scripts to acquire knowledge from the knowledge bases 122A, 122B, 122C, and/or 122D. In one implementation, the work package engine 118 executes instructions from a master script to access one or more of the knowledge bases 122A, 122B, 122C, and/or 122D. In one implementation, the work package engine 118 executes instructions from one script for each knowledge base that is accessed. For example, the work package engine 118 may execute instructions from a first script to acquire knowledge from the knowledge base 122A and may then execute instructions from a second script to acquire knowledge from the knowledge base 122B. The query script generator 110 generates these separate scripts and specifies the order in which these scripts are to be executed by the work package engine 118. For example, the work package engine 118 may execute first and second scripts in serial fashion to acquire knowledge from the knowledge bases 122A and 122B. Subsequently, the work package engine 118 may execute third and fourth scripts in parallel to acquire knowledge from the knowledge bases 122C and 122D.

At a checkpoint 338, the work package engine 118 collects the matched knowledge that has been identified and acquired from the knowledge bases 122A, 122B, 122C, and/or 122D based on a set of generated scripts. If the matched result has low hitting scores from the acquired knowledge based upon the original request or no matched results at all, an action 332 is triggered to generate one or more new scripts. The way in which the new scripts are generated may depend on a set of predefined rules. For example, a rule may relax the search restriction by removing the forced sequence between two knowledge bases. Another rule may change the "And" operation in a search term query to an "Or" operation. After the additional rules are implemented, the new scripts can be generated in action 330. However, such re-generation steps can be discontinued if some knowledge is located or a maximal number of trails is reached, according to one implementation. In this scenario, the result(s) corresponding to the knowledge that has been identified and acquired can be returned back to the user.

In an action 340, there is a final selection by the user if the acquired knowledge does match the user criteria. This selection occurs on the client system 102 after the acquired knowledge has been sent to the client system 102 by the knowledge acquisition engine 106. All of the knowledge acquired from the knowledge bases 122A, 122B, 122C, and/or 122D is compiled by the work package engine 118 and processed by the navigation index generator 112 and the visualization output generator 114 before it is sent to the client system 102. The acquired knowledge is then displayed to the user on a graphical user interface (GUI). For example, the acquired knowledge may include two packages of knowledge acquired during execution of two separate scripts by the work package engine 118. Within the GUI, two entries may be displayed to the user, wherein each entry corresponds to one of the packages of knowledge. The user may then select one of these two entries within the GUI.

Once the user has made a final selection in an action 340, the knowledge acquisition engine 106 updates the selection/sequence map 318 in an action 334 according to the final selection. The map 318 is updated to reflect the specific selection made by the user and the sequence that was used to acquire information from one or more of the knowledge bases 122A, 122B, 122C, and/or 122D. The knowledge acquisition engine 106 determines the specific access sequence that was used to acquire the knowledge corresponding to the user's selection. For example, if the user selects an entry corresponding to a particular knowledge entity or package of knowledge, the knowledge acquisition engine 106 may determine that the knowledge base 122A was accessed prior to the knowledge base 122B to acquire this knowledge. Then, the usage of sequence of the knowledge base 122A to 122B is updated to the corresponding selection. When there are many knowledge bases involved in the selection, it may not be practical to update all possible combinations of the sequences and selections, so only the selections and sequences that are commonly used are recorded in the map 318, according to one implementation.

In an action 328, the knowledge acquisition engine 106 also updates knowledge base dependency information in the knowledge base content correlation data store 324. The knowledge base dependency can be derived from the script used to acquire the knowledge. For each knowledge entity identified by user's action 340, there is a corresponding script generated in the action 330 that leads to the entity. Therefore, the acquisition steps to access other knowledge bases are used when identifying the specific knowledge entity. For example, a specific knowledge entity may be located in the knowledge base 122C and may be identified by a script that includes instructions to access the knowledge bases in the following order: 122A, 122B, 122C, 122D. Since the knowledge entity is located in the knowledge base 122C, the useful information of knowledge dependency can be represented as a set of pairs including (122A, 122B), (122B, 122C), and (122A, 122C). Then the content correlations can be updated for the three pairs of knowledge bases. The knowledge base 122D is not included within this set of pairs because it is not needed when accessing the knowledge entity using the access sequence shown above. However, each of the knowledge bases 122A and 122B may contain information that is needed to access the knowledge entity contained in the knowledge base 122C. For example, certain knowledge that is acquired from the knowledge base 122A may be used as input to acquire additional knowledge from the knowledge base 122B. This additional knowledge may then be used as input to access the knowledge entity contained within the knowledge base 122C. In this case, the correlation between (122A, 122B) and (122B, 122C) is stronger than (122A, 122C). In general, however, the weighting of such correlations is based upon the dependencies between the various knowledge bases that determines how a specific knowledge entity is accessed from a given knowledge base.

Figure 4:
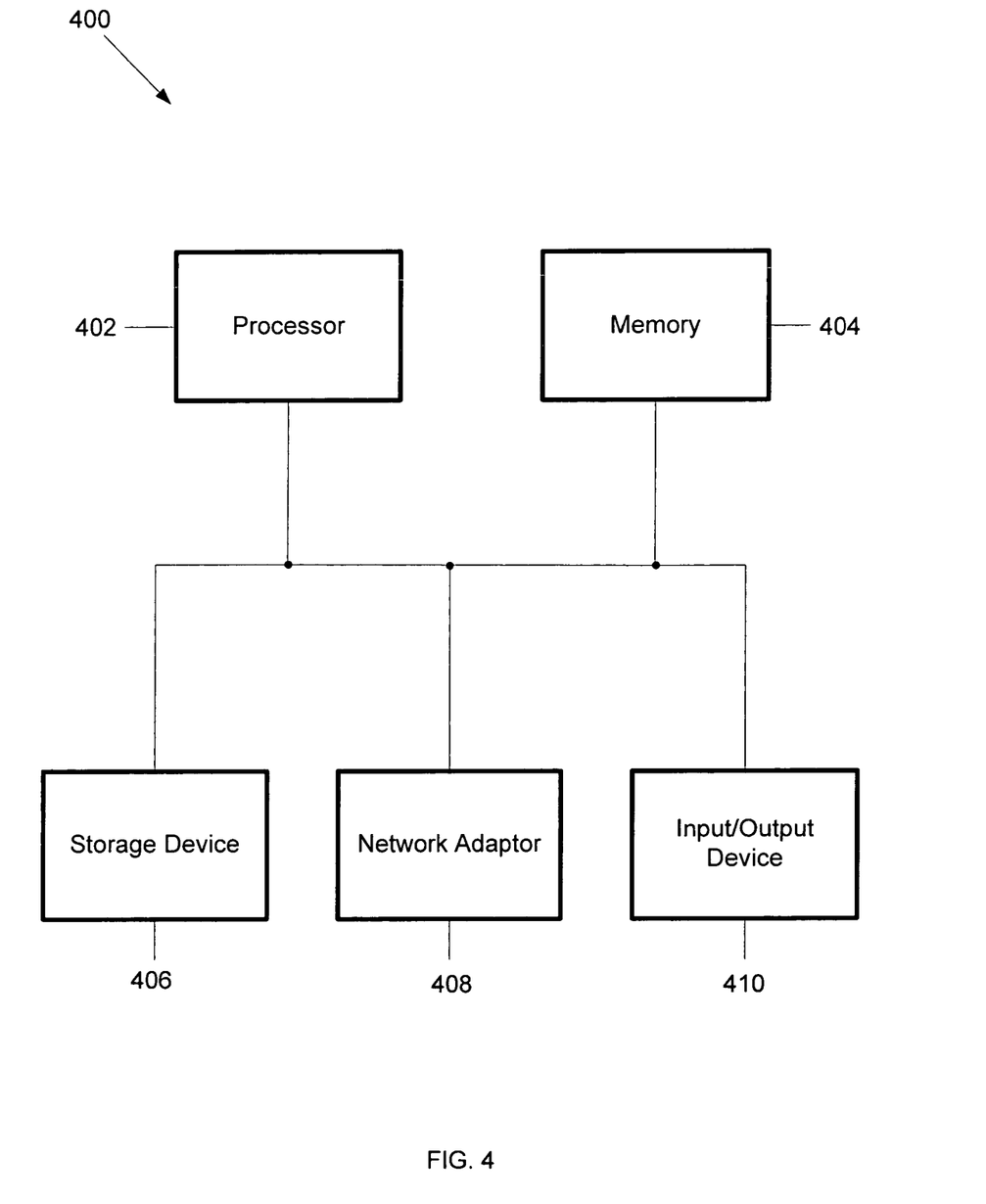
FIG. 4 is a block diagram of a computing device that may be part of the client system or the knowledge acquisition engine shown in FIG. 1, according to one implementation.

FIG. 4 is a block diagram of a computing device 400 that may be part of the client system 102 or the knowledge acquisition engine 106 shown in FIG. 1. The computing system 400 includes a processor 402, a memory 404, a storage device 406, a network adaptor 408, and an input/output device 410. The components 402, 404, 406, 408, and 410 are interconnected using a system bus. The processor 402 is capable of processing instructions for execution within the computing system 400. In one implementation, the processor 402 is a single-threaded processor. In another implementation, the processor 402 is a multi-threaded processor. The processor 402 is capable of processing instructions stored in the memory 404.

The memory 404 stores information within the computing system 400. In one implementation, the memory 404 is a computer-readable medium. In certain implementations, the memory 404 is either a volatile or a non-volatile memory unit.

The storage device 406 is capable of providing mass storage for the computing system 400. For example, the storage device 406 may provide database storage for the computing system 400. In one implementation, the storage device 406 is a computer-readable medium. In various different implementations, the storage device 406 may be a floppy disk device, a hard disk device, an optical disk device, or a tape device.

The network adaptor 408 provides an interface to external network devices. For example, the network adaptor 408 may be contained within both the client system 102 and the knowledge acquisition engine 106 to provide network interface connectivity between these two entities. In one implementation, the network adaptor 408 is a wireless adaptor that provides wireless connectivity.

In one implementation, a computer program product is tangibly embodied in an information carrier. The computer program product contains instructions that, when executed, perform one or more methods, such as those described above. The information carrier is a computer- or machine-readable medium, such as the memory 404, or the storage device 406.

The input/output device 410 provides input/output operations for the computing system 400. The input/output device 410 may include, for example, a keyboard, a pointing device, and/or a display device.

A number of implementations have been described above. Nevertheless, it will be understood that various modifications may be made without departing from the spirit and scope of these implementations. Accordingly, other implementations are within the scope of the following claims.

What is claimed is:

1. A method comprising:
   obtaining, by a knowledge acquisition engine, search information by analyzing a search request received from a client system;
   parsing the search request comprising textual characters to identify keywords, wherein the identified keywords are used to construct corresponding values for predefined fields;
   identifying, by the knowledge acquisition engine, a first knowledge base by matching the search information with contents of the first knowledge base, wherein matching the search information with contents of the first knowledge base includes accessing an index that has been compiled from the first knowledge base;
   identifying, by the knowledge acquisition engine, a second knowledge base by matching the search information with contents of the second knowledge base;
   acquiring knowledge of a first type by sending, by the knowledge acquisition engine, a first request to the first knowledge base; and
   acquiring knowledge of a second type by sending, by the knowledge acquisition engine, a second request to the second knowledge base, the first request and the second request sent sequentially, the second request generated to include a first search term including a portion of the search request originally received from the client system, the second request further comprising a second search term obtained from knowledge acquired in response to the first request to the first knowledge base, the first and second search terms comprising text, wherein the knowledge acquisition engine is implemented on at least one processor.

2. The method of claim 1, further comprising:
   determining that the acquired knowledge of the first and second types does not satisfy the search request;
   upon such determination, identifying a third knowledge base based upon a previously identified relationship between the third knowledge base and either the first or the second knowledge base; and
   acquiring knowledge of a third type by sending a third request to the third knowledge base.

3. The method of claim 2, wherein if the previously identified relationship is between the third knowledge base and the first knowledge base, the method comprises acquiring knowledge of the first type by sending an additional request to the first knowledge base, the additional request being sent independently of the third request.

4. The method of claim 2, wherein if the previously identified relationship is between the third knowledge base and the second knowledge base, the method comprises acquiring knowledge of the second type by sending an additional request to the second knowledge base, the additional request being sent independently of the third request.

5. The method of claim 1, wherein the search request contains textual characters provided by a user.

6. The method of claim 1, wherein matching the search information with contents of the second knowledge base includes accessing an index that has been compiled from the second knowledge base.

7. The method of claim 1, wherein the search request contains values provided by a user for predefined fields.

8. The method of claim 1, further comprising:
   receiving the search request from the client system; and
   sending the acquired knowledge of the first and second types to the client system.

9. The method of claim 1, wherein the first knowledge base comprises a first separate data store, and wherein the second knowledge base comprises a second separate data store.

10. The method of claim 1, wherein the client system includes a mobile device.

11. A system comprising:
a processor; and
a memory, the processor and the memory configured to provide a method comprising:
obtaining, by a knowledge acquisition engine, search information by analyzing a search request received from a client system;
parsing the search request comprising textual characters to identify keywords, wherein the identified keywords are used to construct corresponding values for predefined fields;
identifying a first knowledge base by matching the search information with contents of the first knowledge base, wherein matching the search information with contents of the first knowledge base includes accessing an index that has been compiled from the first knowledge base;
identifying a second knowledge base by matching the search information with contents of the second knowledge base;
acquiring knowledge of a first type by sending, by the knowledge acquisition engine, a first request to the first knowledge base; and
acquiring knowledge of a second type by sending, by the knowledge acquisition engine, a second request to the second knowledge base, the first request and the second request sent sequentially, the second request generated to include a first search term including a portion of the search request originally received from the client system, the second request further comprising a second search term obtained from knowledge acquired in response to the first request to the first knowledge base, the first and second search terms comprising text.

12. A computer-readable storage medium including instructions that, when executed, perform a method comprising:
obtaining, by a knowledge acquisition engine, search information by analyzing a search request received from a client system;
parsing the search request comprising textual characters to identify keywords, wherein the identified keywords are used to construct corresponding values for predefined fields;
identifying a first knowledge base by matching the search information with contents of the first knowledge base, wherein matching the search information with contents of the first knowledge base includes accessing an index that has been compiled from the first knowledge base;
identifying a second knowledge base by matching the search information with contents of the second knowledge base;
acquiring knowledge of a first type by sending, by the knowledge acquisition engine, a first request to the first knowledge base; and
acquiring knowledge of a second type by sending, by the knowledge acquisition engine, a second request to the second knowledge base, the first request and the second request sent sequentially, the second request generated to include a first search term including a portion of the search request originally received from the client system, the second request further comprising a second search term obtained from knowledge acquired in response to the first request to the first knowledge base, the first and second search terms comprising text.

* * * * *